(12) United States Patent
Baert et al.

(10) Patent No.: US 7,047,607 B2
(45) Date of Patent: May 23, 2006

(54) PROCESS FOR MANUFACTURING A BAND-SHAPED NON-WOVEN PRODUCT WITH INCREASED TENSILE STRENGTH

(75) Inventors: Louis Baert, Fontvieille (MC); Paul Baert, Londerzeel (BE)

(73) Assignee: Wattex, Buggenhout (BE)

( * ) Notice: Subject to any disclaimer, the term of this patent is extended or adjusted under 35 U.S.C. 154(b) by 100 days.

(21) Appl. No.: 10/445,080

(22) Filed: May 27, 2003

(65) Prior Publication Data

US 2004/0014388 A1  Jan. 22, 2004

Related U.S. Application Data

(63) Continuation-in-part of application No. 09/341,020, filed as application No. PCT/BE97/00140 on Dec. 29, 1997, now abandoned.

(30) Foreign Application Priority Data

Dec. 30, 1996  (BE) .................................... 9601084

(51) Int. Cl.
*D04H 5/02* (2006.01)
*D04H 5/08* (2006.01)

(52) U.S. Cl. .......................................... 28/107; 28/102

(58) Field of Classification Search ................. 28/107, 28/112, 109, 108, 110, 111, 101, 102, 113–115, 28/104, 105; 156/148, 178; 442/367, 368, 442/369, 402–407, 35, 366
See application file for complete search history.

(56) References Cited

U.S. PATENT DOCUMENTS

| | | | | |
|---|---|---|---|---|
| 2,381,184 A | * | 8/1945 | Ripley | .................. 428/108 |
| 3,085,309 A | * | 4/1963 | Olson | .................. 428/85 |
| 3,191,257 A | * | 6/1965 | Smith, II | .................. 28/108 |
| 3,257,259 A | * | 6/1966 | Law | .................. 428/91 |
| 3,337,387 A | * | 8/1967 | Owen | .................. 428/91 |
| 3,576,687 A | * | 4/1971 | Parlin | .................. 156/148 |
| 3,920,511 A | * | 11/1975 | Grieves et al. | .................. 162/348 |
| 4,007,071 A | * | 2/1977 | Addie et al. | .................. 156/148 |
| 4,183,985 A | * | 1/1980 | Lemieux | .................. 428/91 |
| 4,261,754 A | | 4/1981 | Krenchel | |
| 4,283,454 A | * | 8/1981 | Buchanan | .................. 442/215 |
| 4,617,219 A | | 10/1986 | Schupack | |
| 5,063,099 A | | 11/1991 | Tedesco et al. | |
| 5,118,550 A | | 6/1992 | Baravian et al. | |
| 5,200,260 A | * | 4/1993 | Hsu | .................. 442/189 |
| 5,219,633 A | | 6/1993 | Sabee | |
| 5,475,904 A | * | 12/1995 | Le Roy | .................. 28/108 |
| 5,856,243 A | | 1/1999 | Geirhos | |
| 6,235,657 B1 | | 5/2001 | Schops et al q | |
| 6,735,835 B1 | * | 5/2004 | Wong | .................. 28/107 |

FOREIGN PATENT DOCUMENTS

| | | |
|---|---|---|
| EP | 506051 | 9/1992 |
| EP | 564784 | 10/1993 |
| GB | 2169930 | 7/1986 |

* cited by examiner

*Primary Examiner*—Amy B. Vanatta
(74) *Attorney, Agent, or Firm*—Sughrue Mion, PLLC

(57) ABSTRACT

The invention relates to a process for manufacturing a band-shaped non-woven product reinforced by strengthening wires or filaments and showing an increased tensile strength longitudinally or in the cross direction of the band-shaped product, characterized in that, in the direction in which the tensile strength of the non-woven product is to be increased, strengthening wires and/or filaments are applied to it, and joined to the fleece of which the non-woven consists, by application of the needling technique.

7 Claims, No Drawings

… (1)

PROCESS FOR MANUFACTURING A BAND-SHAPED NON-WOVEN PRODUCT WITH INCREASED TENSILE STRENGTH

This application is a Continuation-in-Part of application Ser. No. 09/341,020, filed Aug. 30, 1999 now abandoned, which is a 371 of PCT/BE97/00140 filed Dec. 29, 1997; the disclosure of which is incorporated herein by reference.

BACKGROUND OF THE INVENTION

This invention relates to a process for manufacturing a band-shaped non-woven product with increased tensile strength, longitudinally and/or in the cross direction of the band-shaped product, as well as to the band-shaped non-woven products manufactured according to this process.

It is the aim of the invention to realize a band-shaped non-woven product of the above discussed type, the tensile strength (according to DIN 53857) of which is increased longitudinally, in the cross direction, or in both directions.

Non-woven products of the kind referred to, and having such characteristics, find a remarkable application as a geotextile or as a carrier for bituminous roofing bands.

In European patent application EP-A-0.506.051 it is proposed to reinforce a non-woven structure having a specific weight with polyester filaments showing an elasticity comparable with that of the non-woven structure. The strengthening filaments are applied between two layers of non-woven material and fixed by making use of a binder and thermo-mechanical means.

The strengthening of non-woven products has already been proposed in the following documents: GB 2 169 930 A and U.S. Pat. No. 5,219,633. In the former reference, essentially the elasticity of the product is considered, and not the application of the process on band-shaped products essentially intended as a carrier for bituminous roofing bands is suggested. The increase of the tensile strength of such band-shaped non-woven products presents very specific requirements, especially when the tensile strength is considered exclusively longitudinally and/or in the cross direction of the product.

U.S. Pat. No. 3,576,687—Parlin describes a process for manufacturing an elongated band-shaped non-woven product. In this known process the fleeces are made of thermoplastic fibers and are deposited on warp threads by means of cross-lappers, which operate in a filling direction. The fibers are deposited in a fluffed-up condition on the warp threads as the warp threads advance. When the desired thickness of the fibers has been deposited on the warp threads, the fibers, together with the warp threads, are subjected to the action of one or more needle looms in which barbed needles are forced through the deposited fibers.

A drawback of the process described in U.S. Pat. No. 3,576,687 is that the fibers in the fleeces are randomly oriented, which adversely affects the longitudinal strength of the product. Moreover, as the warp threads and the fleeces are both subjected to the needle looms, the longitudinal extension of the warp threads in the final product will be affected.

In the latter reference, the production of a non-woven material as a raw material for diapers, among others, is described, so it will be immediately clear that the process described in this reference complies with very specific requirements, and does not in any way provide any indication to the issue discussed here, i.e. the realisation of carriers for asphalt bands and geotextiles by strengthening of the tensile strength of the band-shaped product, specifically longitudinally and/or in the cross direction.

SUMMARY OF THE INVENTION

In order to achieve the proposed aim, the process according to the invention is primarily characterized in that, in the direction in which the tensile strength of the non-woven is to be increased, strengthening wires and/or filaments are applied to it, and are joined to the fleece of which the non-woven consists, by application of the needling technique.

Still according to the invention, above mentioned fleece with the strengthening wires and/or filaments applied to it, are thermofixed.

In a first embodiment, for manufacturing the fleece of the non-woven, natural, synthetic or mineral staple fibres are used, or a combination thereof.

According to another possible embodiment, for manufacturing the fleece of the non-woven, continuous synthetic filaments are used.

Other details and advantages of the invention will appear from the following description of a process for manufacturing a non-woven product with increased tensile strength and of the thus obtained non-woven according to the invention.

DETAILED DESCRIPTION OF THE INVENTION

This description is exclusively given as an example and does not limit the invention.

The current non-wovens are built up, either of staple fibres, or of continuous filaments. In these non-wovens, the ratio of the strength longitudinally and in the cross direction is determined by the ratio of the number of fibres or filaments which are found longitudinally or in the cross direction, and by their respective tensile strength.

It will immediately be noticed, that the band-shaped products according to the invention are clearly distinguished from the products described in the two references referred to in the preamble. In patent application GB 2 169 930 A, very clearly an elastic non-woven is described, while U.S. Pat. No. 5,219,633 describes disposable, non-woven products, such as diapers, the requirements and specifications of which are not connected with the band-shaped non-wovens according to this application.

The fleece on which the non-woven material according to the invention is based, may be composed of synthetic, natural or mineral staple fibres, or a combination of these fibres.

It may also be composed of several non-wovens, also based on the same synthetic, natural or mineral fibres, or mixtures thereof. The fleece may also be built up of continuous synthetic filaments, either in combination with another non-woven or not.

The wires or filaments used for strengthening the fleece, may be described as follows:
a) wire composed of synthetic fibres or of a mixture or combination of these synthetic fibres with natural and/or mineral fibres. The wires may also be twined with synthetic and/or mineral filaments.
b) when using filaments, one may call upon synthetic filaments, or filaments which are twined with wires and/or mineral filaments.

The wires which are used for twining, in turn, may consist of synthetic fibres, natural fibres, mineral fibres, or a mixture thereof. Preferably, PES filaments having a thickness of 1100 dtex, a tensile strength of ±7 kg per filament, an elasticity between 15 and 25%, a torsion of ±60 and a weight of 0.11 g/current meter, are used. When a non-woven based on staple fibres is considered, the fleece is built up of synthetic, natural or mineral staple fibres, or a combination of these fibres. The whole is converted into a fleece by using a card, or the technique known as "air-lay".

For manufacturing a non-woven product according to the present invention, the fleeces are first built-up. This is preferably realised by starting from fibres having a length situated between 130 and 150 mm. The fibres hook together due to their structure, thereby forming a non-woven fleece. Preferably, the fibres are oriented in a rectilinear manner so that the different fibres extend in parallel with respect to each other within the fleece. In the preferred embodiment a fleece of 30 g/m$^2$ is manufactured. In order to obtain a more consistent non-woven and to reach a predetermined weight, several fleece layers are superposed. So, for example, four layers of fleeces are superposed in order to obtain a non-woven of 120 g/m$^2$. The different layers of fleeces are then supplied to a cross-laying device operating at an adjustable speed. In order to preserve the rectilinear orientation of the fibres in the different fleeces, the speed at which the different fleeces are cross-layed is adjusted.

Once the speed has been adjusted the different fleeces are brought together by the cross-laying device. Once the fleeces are superposed, it is necessary to connect them together. This is preferably realised by using a needling technique. In order to obtain an efficient needling, the fleeces are first needled by entering the needles from the upperside, and thereafter, by entering the needles from the underside. By using this needling technique, the different fleeces are brought and bound together in order to form a coherent non-woven.

When the use of filaments (spunbounds) is considered, it is built up of continuous filaments, which in turn are needled, or when thermally bound fleeces are concerned, are compressed by means of a calender, and this at a temperature which is sufficiently high to be able to melt filaments with a lower melting point.

When in a non-woven based on staple fibres, the highest tensile strength is to be realized in the cross direction, the basic fleeces coming from a card, or by application of the technique known as "air-lay", are brought together by means of a cross laying device, until the desired weight is obtained, whereby the speed of the cross laying device is adjusted such, that the rectilinearity of the staple fibres is preserved as much as possible. Only afterwards, the fleece is pre-needled on a pre-needling machine.

Preferably, PES fibres will be used, with a thickness varying between 3 and 6 deniers, or with a mixture thereof. Fibres with a length of 125 and 150 mm are preferred.

When in a non-woven based on staple fibres, the highest tensile strength of the non-woven is to be created longitudinally, the card fleece, of which the staple fibres are parallel to a high degree, is simply rolled up after a light pre-needling or calendering.

When staple fleeces are to be produced in which the difference in tensile strength longitudinally and in the cross direction is to be reduced to a minimum, the process described above with reference to obtaining a non-woven with the highest tensile strength in the cross direction, is applied, but prior to the final needling, the non-woven is stretched by means of a draw bench, so that the fibres will take up a less parallel position. By doing so, the difference in tensile strength longitudinally and in the cross direction is smaller.

If continuous filaments are used, the division of the tensile strength longitudinally and in the cross direction is determined by the degree of rectilinearity or non-rectilinearity of the filament. The longitudinal tensile strength is increased in case of a clear excess of parallel filaments found together. The tensile strength is increased in the cross direction when less rectilinear filaments are found.

In order to guarantee the specifications of the final product, the strengthening wires and/or filaments are laid tensionless onto the fleece, whereby
a) wires and/or filaments wound onto bobbins, or
b) bobbins and/or filaments which are wound, or a combination of both, may be used.

In order to apply the strengthening wires on the non-woven, the wires are brought to the non-woven in such a manner that the different wires extend substantially in parallel to each other when they reach the non-woven. A needling technique is used to apply the strengthening wires on the fleece. After having introduced the strengthening wires in the fleece, the thus obtained product is preferably heated up to a temperature of approximately 250° C. in order to improve the link between the wires and the fleece.

The attachment of wires and/or filaments may also be realized on an already thermostabilised fleece. The fleece is stabilised by a calender or hot air drum.

It is important that the process enables the elasticity, in the direction in which the wires and/or filaments are found, to be varied within certain limits, and this by adapting the ratio of feed rate and speed of thermostabilising element.

The finishing comprises:
a) the thermostabilisation
b) the binding of the fibres and/or filaments.

If the basic non-woven is not yet thermally stabilised (by calender or hot air drum), the whole of non-wovens, with its wires or filaments, or a combination of both, is thermally stabilised. This may be done with a calender (of the Stork type), or a drum to which hot air is blown (e.g. of the Fleissner type).

If in the mixture or composition of the filaments fusible fibres or bicomponent fibres or fusible filaments or bicomponent filaments have been used, the product is herewith finally finished.

If no fusible or bicomponent fibres, or fusible or bicomponent filaments have been used, for the binding of the fibres or filaments together, resins are used, preferably acrylic resins, because of their good temperature resistance.

These acrylic resins are applied to the non-woven and squeezed out by means of a sizing machine to the required amount.

The whole of non-woven and acrylic resin is then dried up to a temperature of 210° C., or until the resin is dried.

By applying the above described process, a final product is obtained with application possibilities both as bituminous roofing bands and as a geotextile.

The advantage of the product according to the invention is that a non-woven is obtained where the tensile strength is essentially obtained due to the presence of strengthening wires. A relatively light product is obtained which nevertheless has a considerable tensile strength. Consequently, the product is suitable to resist the high temperature of a bituminous bath when a bituminous membrane is manufactured and will maintain its properties over several years. The strengthening wires on the fleece will not be dissociated from the fleece when the non-woven is brought into the bituminous bath since the pulling force applied on the non-woven is essentially exerted on the strengthening wires when the non-woven is pulled through the bath. The fleece, therefore, does not feel, so to say, the pulling force, and a relatively light fleece can be used.

What is claimed is:

1. A process for manufacturing an elongated band-shaped non-woven product for use either in a geotextile or as a carrier in a bituminous roofing band, said method comprising the steps of:
    building up a number of fleeces from fibers or filaments, whereby the fibers or filaments of each fleece are rectilinearly oriented in such a manner that they extend in parallel with respect to each other;
    determining a predetermined weight for said non-woven product to be manufactured;
    collecting an amount of said fleeces in order to obtain said predetermined weight;
    supplying said amount of fleeces to a cross-laying device operating at an adjustable speed;
    adjusting said speed of said cross-laying device in such a manner that the rectilinear orientation of said fibers or filaments in each fleece of said amount is substantially preserved during a bringing together of said amount of fleeces;
    bringing together said amount of fleeces by means of said cross-laying device operating at said adjusted speed in order to build-up said elongated band-shaped non-woven product at said predetermined weight;
    applying strengthening wires in a direction corresponding to a longitudinal direction of said elongated non-woven product; and
    incorporating said strengthening wires into said non-woven product by using a needling technique.

2. The process as claimed in claim 1, further comprising the step of needling said amount of fleeces from an upper side and an underside to build-up the non-woven product.

3. The process as claimed in claim 1, wherein the applied strengthening wires are made of polyester filaments and have a thickness of 1100 dtex, a tensile strength of substantially 7 kg per filament, an elasticity between 15 and 25%, a torsion of substantially 60, and a weight of almost 0.11 g per current meter.

4. The process as claimed in claim 1, wherein said filaments are continuous filaments.

5. A process for manufacturing an elongated band-shaped non-woven product for use either in a geotextile or as a carrier in a bituminous roofing band, said method comprising the steps of:
    building up a number of fleeces from fibers or filaments, whereby the fibers or filaments of each fleece are rectilinearly oriented;
    determining a predetermined weight for said non-woven product to be manufactured;
    collecting an amount of said fleeces in order to obtain said predetermined weight;
    supplying said amount of fleeces to a cross-laying device operating at an adjustable speed;
    adjusting said speed of said cross-laying device in such a manner that the rectilinear orientation of said fibers or filaments in each fleece of said amount is substantially preserved during a bringing together of said amount of fleeces;
    bringing together said amount of fleeces by means of said cross-laying device operating at said adjusted speed in order to build-up said elongated band-shaped non-woven product at said predetermined weight;
    applying strengthening wires in a direction corresponding to a longitudinal direction of said elongated non-woven product;
    incorporating said strengthening wires into said non-woven product by using a needling technique; and
    needling said amount of fleeces from an upper side and an underside to build-up the non-woven product.

6. The process as claimed in claim 5, wherein the applied strengthening wires are made of polyester filaments and have a thickness of 1100 dtex, a tensile strength of substantially 7 kg per filament, an elasticity between 15 and 25%, a torsion of substantially 60, and a weight of almost 0.11 g per current meter.

7. The process as claimed in claim 5, wherein said filaments are continuous filaments.

* * * * *